(12) United States Patent
Self

(10) Patent No.: US 8,433,376 B2
(45) Date of Patent: Apr. 30, 2013

(54) SMALL FORM FACTOR COMMUNICATION DEVICE

(76) Inventor: Darrel Self, Davidson, NC (US)

( * ) Notice: Subject to any disclaimer, the term of this patent is extended or adjusted under 35 U.S.C. 154(b) by 621 days.

(21) Appl. No.: 12/697,072

(22) Filed: Jan. 29, 2010

(65) Prior Publication Data

US 2010/0279746 A1 Nov. 4, 2010

Related U.S. Application Data

(60) Provisional application No. 61/148,390, filed on Jan. 29, 2009.

(51) Int. Cl.
*H04M 1/00* (2006.01)
(52) U.S. Cl.
USPC ............. 455/575.1; 455/186.2; 455/90.3; 715/786; 715/830; 345/156; 345/684
(58) Field of Classification Search .......... 715/830, 715/787, 786, 773, 778, 800, 706; 455/566, 455/575.1, 556.1, 556.2, 575.3, 90.3, 550.1, 455/565, 401, 186.2; 345/156–169, 661, 345/684; 379/362–364, 433.13, 433.03
See application file for complete search history.

(56) References Cited

U.S. PATENT DOCUMENTS

| 7,154,479 | B2* | 12/2006 | Balle et al. | 345/169 |
| 7,860,536 | B2* | 12/2010 | Jobs et al. | 455/566 |
| 2005/0037814 | A1* | 2/2005 | Yasui et al. | 455/566 |
| 2007/0300187 | A1* | 12/2007 | Hama et al. | 715/830 |
| 2009/0066648 | A1* | 3/2009 | Kerr et al. | 345/158 |
| 2010/0037185 | A1* | 2/2010 | Li | 715/863 |
| 2010/0271402 | A1* | 10/2010 | Nagashima et al. | 345/661 |
| 2012/0268401 | A1* | 10/2012 | Itoh et al. | 345/173 |

* cited by examiner

*Primary Examiner* — Sujatha Sharma
(74) *Attorney, Agent, or Firm* — Pitts & Lake, P.C.

(57) ABSTRACT

A small form factor communication device. The small form factor communication device incorporates a multi-purpose control allowing the functionality of the small form factor communication device to be accessed. The multi-purpose control provides feedback allowing the user to operate the small form factor communication device by touch.

1 Claim, 5 Drawing Sheets

SMALL FORM FACTOR COMMUNICATION DEVICE

CROSS-REFERENCE TO RELATED APPLICATIONS

This application claims the benefit of U.S. Provisional Application 61/148,390, filed Jan. 29, 2009.

STATEMENT REGARDING FEDERALLY-SPONSORED RESEARCH OR DEVELOPMENT

Not Applicable

BACKGROUND OF THE INVENTION

1. Field of Invention

This invention relates to a communication device. More specifically, this invention relates to a communication device having features and circuitry optimized for creating a small form factor communication device.

2. Description of the Related Art

Cellular telephones are well known. Since its introduction, advances in technology have permitted the size of the cellular telephone to be reduced. However, certain user interface components, particularly as the dialing pad and the display screen, are considered ubiquitous and have served to limit the smallest practical size for cellular telephones. More recently, written communication, commonly referred to as "texting," has become a significant mode of communication embraced by cellular telephone users. To improve the user experience when texting, a cellular telephone often includes an expanded keypad that makes alphabetic and common symbols readily available for typing. Another advancement for the cellular telephone is the inclusion of larger and/or higher resolution displays to facilitate the viewing of pictures or web pages. One drawback to these displays is the increased power requirements and the corresponding size of the batteries required to provide acceptable usage times. Finally, regardless of the components, ergonomic considerations place limits on the size of the cellular telephone. Thus, a modern cellular telephone design seeks to strike a balance between size, functionality, power consumption, and usability.

BRIEF SUMMARY OF THE INVENTION

A communication device comprising: a housing having a first face, a second face opposing said second face, a first end, a second end opposing said first end, a first side, and a second side opposing said first side; a function switch located on said first side of said housing, said function switch being moveable from a resting position to a first position, a second position, and a third position, said first position being in a first direction from said resting position, said second position being in a second direction from said resting position, said second direction being opposite to said first direction, said third direction being inward relative to said housing and orthogonal to said first direction and said second direction; a controller maintaining a counter, said counter being initialized to zero, said controller incrementing said counter when said function switch is moved to said first position, said controller decrementing said counter a second input when said function switch is moved to said second position, and said controller operating on said counter and setting said value of said counter to zero when said function switch moved to said third position; a symbol ring located on said first face of said housing, said symbol ring displaying a plurality of symbols, each symbol of said plurality of symbols corresponding to a value of said counter; and a selection indicator adapted to indicate a selected symbol in said symbol ring based on the value of said counter.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A small form factor (SFF) communication device is described in detail herein and illustrated in the accompanying figures. The SFF communication device incorporates a multi-purpose control allowing the functionality of the SFF communication device to be accessed. The multi-purpose control provides feedback allowing the user to operate the SFF communication device by touch. In one embodiment, the SFF communication device has dimensions of approximately 6.10 cm×3.57 cm×0.76 cm (2.4 in×1.4 in×0.3 in). At this size, the communication is generally the size of a key fob commonly used for remote entry to an automobile. Unlike the remote entry key fob, the SFF communication device incorporates a fully functional cellular telephone with a full-duplex speakerphone and polyphonic ringtones, a vibratory alert, and an operational Global Positioning System (GPS) receiver.

Figure 1:
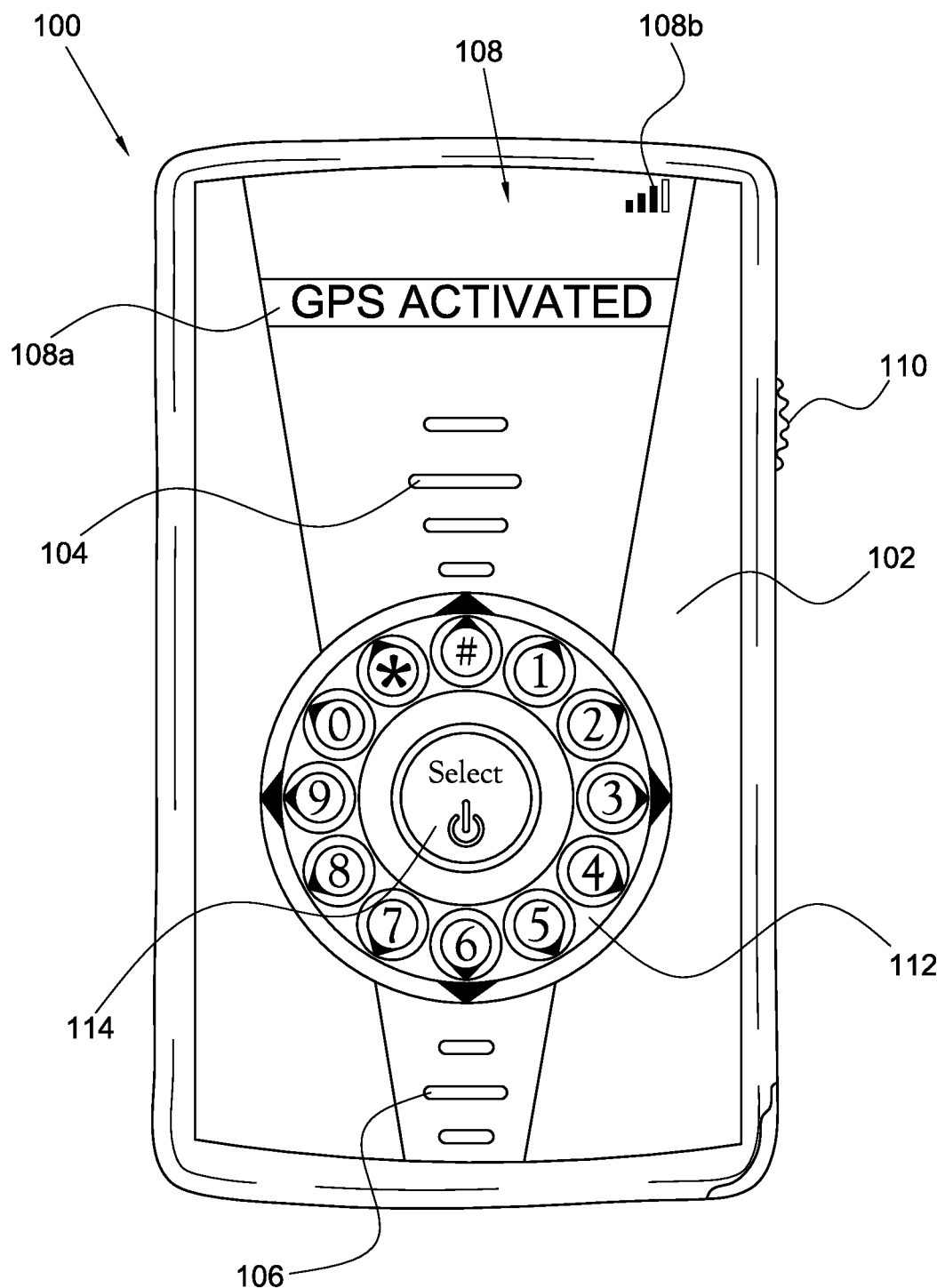
FIG. 1 is a front elevation view of one embodiment of a small form factor (SFF) communication device.

FIG. 1 illustrates a front elevation view of one embodiment of the SFF communication device 100. The SFF communication device is contained in a housing 102. In the illustrated embodiment, the user interfaces for several features of the SFF communication device are visible. As illustrated, the housing 102 defines a set of speaker slots 104 and a set of microphone slots 106 that permit direct passage (as opposed to conduction through the body of the housing) of sound waves of the interior and exterior of the housing. The SFF communication device 100 also includes a display area 108 for visually communicating messages to the user. A function switch 110 located on the side of the SFF communication device provides access to virtually all functions of the SFF communication device 100. The function switch 110 is ergonomically positioned to allow easily manipulation by the thumb while holding the SFF communication device 100 in one hand. The symbol ring 112 and the special action button 114 form a visually significant feature on the front of the SFF communication device 100. The symbol ring 112 offers a rapid visual indication in response to actuation of the function switch 110. The special action button 114 is a programmable, dedicated button that provides direct access to a single function of the SFF communication device 100.

The display area 108 includes one or more display units that are capable of visually displaying various types of information to the user. Certain information shown in the display area is textual (alpha-numeric, punctuation, and special characters), while other information like the signal strength notification or a power indication is represented by a single LED. Consistent with the design goals for the SFF communication device 100, the display area 108 does not occupy a significant amount of space or consume significant amounts of power. This is a marked contrast with the current trend in electronics where most devices are fitted with the largest, high-resolution color liquid crystal displays (LCDs) that can be incorporated into the design. In one embodiment, the display area 108 uses a single-line, multi-segment light emitting diode (LED) display 108a to show textual messages. The power consumption of an LED display is substantially less than an LCD display of comparable size. Contrasted with an LCD display, substantially fewer and smaller electronics components are required to support an LED display. Other messages, such as a power indicator or the signal strength indicator, are generated using single LEDs or smaller LED units 108b. In the illustrated embodiment, the display area 108 is communicating a textual message to notify the user that the global positioning system (GPS) function of the SFF communication device 100 has been activated and provides a bar graph showing the current signal strength.

Figure 2:
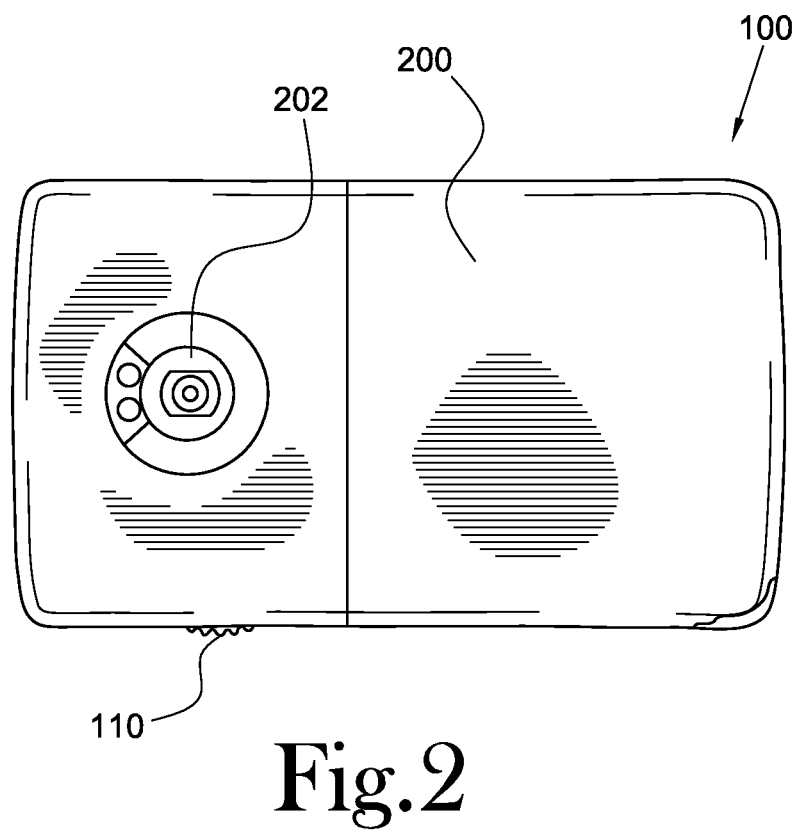
FIG. 2 is a rear elevation view of the SFF communication device of FIG. 1.

FIG. 2 illustrates a rear elevation view of one embodiment of the SFF communication device 100. In the illustrated embodiment, the real access panel 200 of the SFF communication device is visible. Also visible is the lens 202 of an optional digital camera integrated into the SFF communication device.

Figure 3:
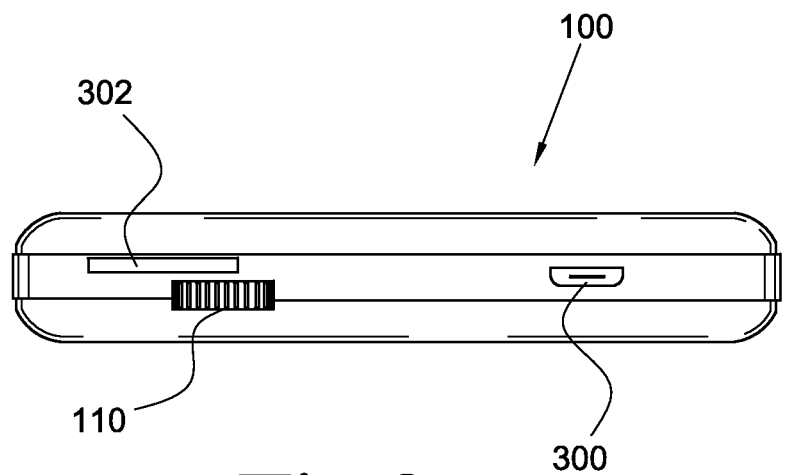
FIG. 3 is a right side elevation view of the SFF communication device of FIG. 1.

FIG. 3 illustrates a side elevation view of one embodiment of the SFF communication device 100. The SFF communication device 100 includes a external communications port 300 allowing communication with an external local device. In one embodiment, the external communications port 300 is capable of two-way data communication between the SFF communication device 100 and an external device and is also capable of being powered by or supplying power to the external device.

The SFF communication device 100 optionally includes a card slot 302 for accepting accessories. In one embodiment of the SFF communication device designed for use on the Global System for Mobile communications (GSM) network, the card slot 302 accepts a Subscriber Identity Module (SIM) card. In another embodiment, the card slot 302 accepts other types of accessory cards. One currently available and commonly used accessory is a flash memory card used to add additional storage capability and/or transfer data (e.g., photographs) between the SFF communication device and an external device. The card slot 302 is not intended to be limited to accepting memory cards, and those skilled in the art will appreciate that other existing (e.g., micro, mini, and standard Secure Digital or Compact Flash) and yet to be developed card formats can be used without departing from the scope and spirit of the present invention.

Figure 4:
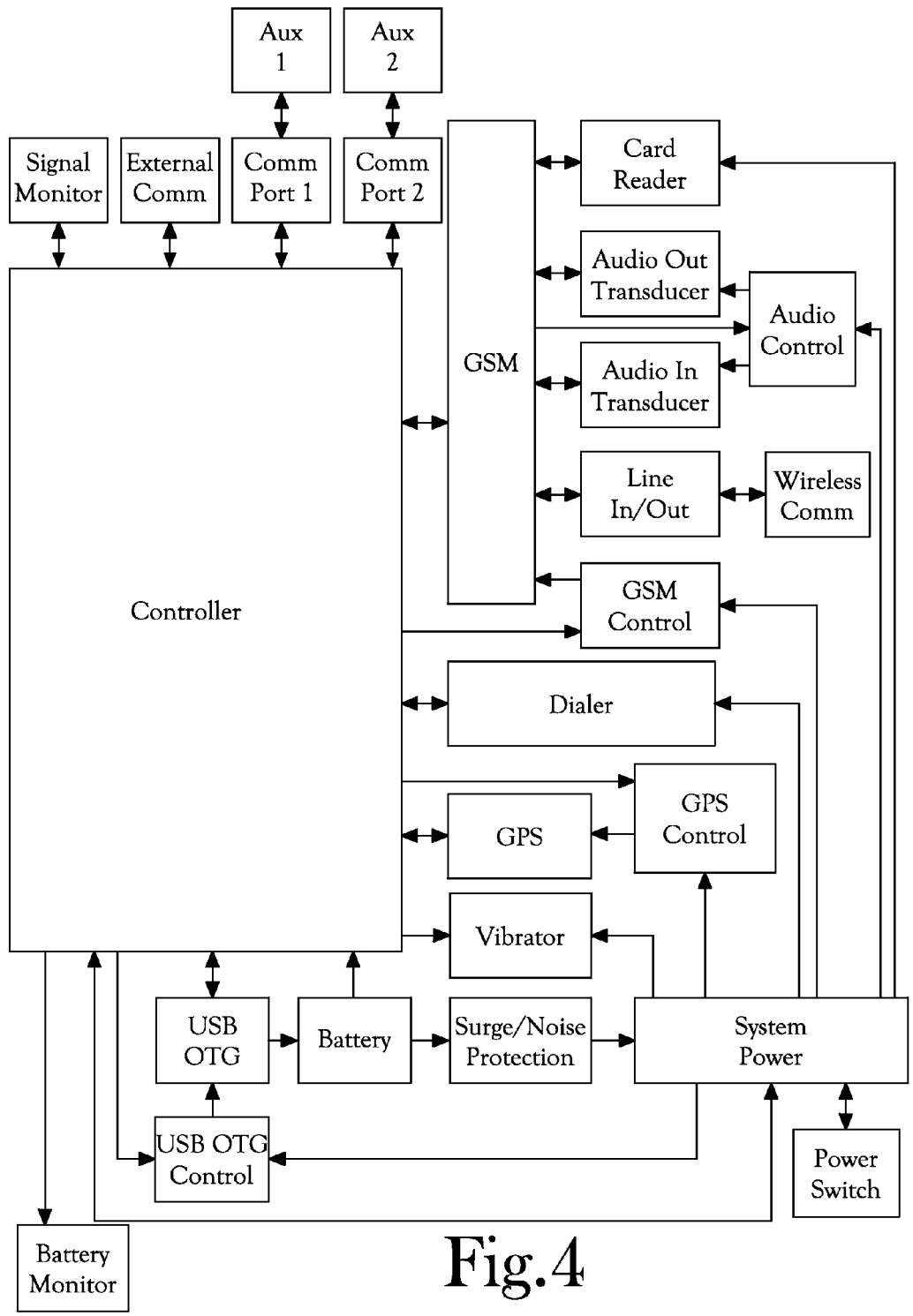
FIG. 4 is a block diagram of one embodiment of the SFF communication device.

FIG. 4 is a block diagram of one embodiment of the SFF communication device. The SFF communication device includes a controller providing processing, memory, and data acquisition functionality. The processor, memory, and data acquisition device can be realized in a single integrated circuit or as separate components. The controller is in two-way communication with a number of circuits in the SFF communication device including the external communication port, one or more communications ports, cellular communications circuitry, the dialer circuit, a GPS circuit, the USB OTG circuitry, and the system power supply. The controller receives power from the battery circuit. The controller sends control signals to the signal monitor, the battery monitor, the vibrator, and the power control circuits. One skilled in the art will appreciate that controller, as used herein, generically refers to an control or processing unit that provides the necessary logical and control functions to implement the SFF communication device.

The telecommunications circuitry includes an audio output transducer circuit, an audio input transducer, and a line level circuit, all in communication with a cellular phone circuit. The cellular phone circuit provides communication over an available cellular phone network. In one embodiment where the cellular phone circuit operates on the GSM/GPRS network, the card reader operates as a SIM card reader. The audio output transducer is a device capable of transforming electrical signals, such as ring tones and received voice signals, into human audible sounds. In one embodiment, the audio output transducer is a speaker. The audio input transducer is a device capable of converting ambient sounds in to electrical signals suitable for transmission through the cellular phone network. In one embodiment, the audio input transducer is a microphone. The line level circuit produces line level signals suitable for use with an external headset or speaker and accepts line level signals from an external headset or microphone. A universal headphone jack (2.5 mm connector) is provided. In one embodiment, the line level circuit is in communication with an optional wireless communication circuit that allows the use of external devices without a wired connection using a wire replacement technology (e.g., Bluetooth®). Alternatively, the wireless communication circuit could replace the line level circuit.

The communication ports connected to the controller allow the SFF communication device to interact with external devices or optional internal circuits. The external communications port is used to connect the SFF communication device to an external device. In one embodiment, the external communication port is capable of two-way data communication between the SFF communication device and an external device and is also capable of being powered by or supplying power to the external device. Using currently available technology, this functionality is accomplished by the inclusion of a Universal Serial Bus (USB) On-The-Go (OTG) Micro-AB receptacle, which offers suitable functionality in a suitably small package (approximately 2 mm by 7 mm). In another embodiment, the external communications port is a full communication port, e.g., a parallel or serial port, that allows full access to the controller of the SFF communication device, which provides the ability to customizing, program, update, and perform diagnostics on the SFF communication device in the field (i.e., after manufacture) and without requiring connection to a communication network provider (e.g., a cellular service provider).

The external communication port is not intended to be limited to the communication of data and power. For example, by selecting an appropriate communication technology (e.g., a currently available high definition multimedia interface) audio and/or video data could be transmitted. Finally, in certain embodiments, a custom port or more than one external communication port may be provided to achieve full functionality where an existing standard communication technology does not exist. For example, one embodiment of the SFF communication device includes a USB OTG connector in combination with a mini phono connector to add audio output. Those skilled in the art will appreciate that other existing and yet to be developed communication technologies can be used to implement the external communications port without departing from the scope and spirit of the present invention.

The internal communications ports, communications ports 1 and 2, are connectors or headers that allow optional circuits to be added to and removed from the SFF communication device to add functionality in a modular fashion. Examples of optional circuits usable with the SFF communication device are radio frequency identification (RFID) tag reader circuits and bar code reader circuits.

The GPS circuit in communication with the controller is a fully functional GPS receiver that allows the SFF communication device to obtain position data from the GPS system. The position information can optionally be transmitted through the cellular circuit, for example, to provide compatibility or enhanced functionality with 9-1-1 systems.

The SFF communication device includes a number of user interface components. In addition to those features previously discussed, such as audio output transducers and the LED displays, a vibrator circuit. The vibrator circuit is a transducer that generates a vibratory alert intended to have a magnitude and a low frequency that is perceptible by human through tactile perception with minimal audible sound generation to minimize disruptions of others when alerts are generated. It will be appreciated that sounds are vibrations and various mediums transmit sound waves with various efficiency so that total silence is not achievable.

The SFF communication device incorporates significant power saving features to achieve excellent battery life. As shown in FIG. 4, the SFF communication device includes an audio power control circuit, a GSM power control circuit, a GPS power control circuit, and a USB OTG power control circuit. The various power control circuits operatively connect and disconnect the respective circuits to and from the system power supply on demand or when the feature is unavailable (e.g., turning off power to the GSM circuit when no service is available). By completely isolating the currently unneeded circuits, the residual current draw of those circuits that typically exists even when components are placed in low-power/sleep modes is eliminated.

Figure 5:
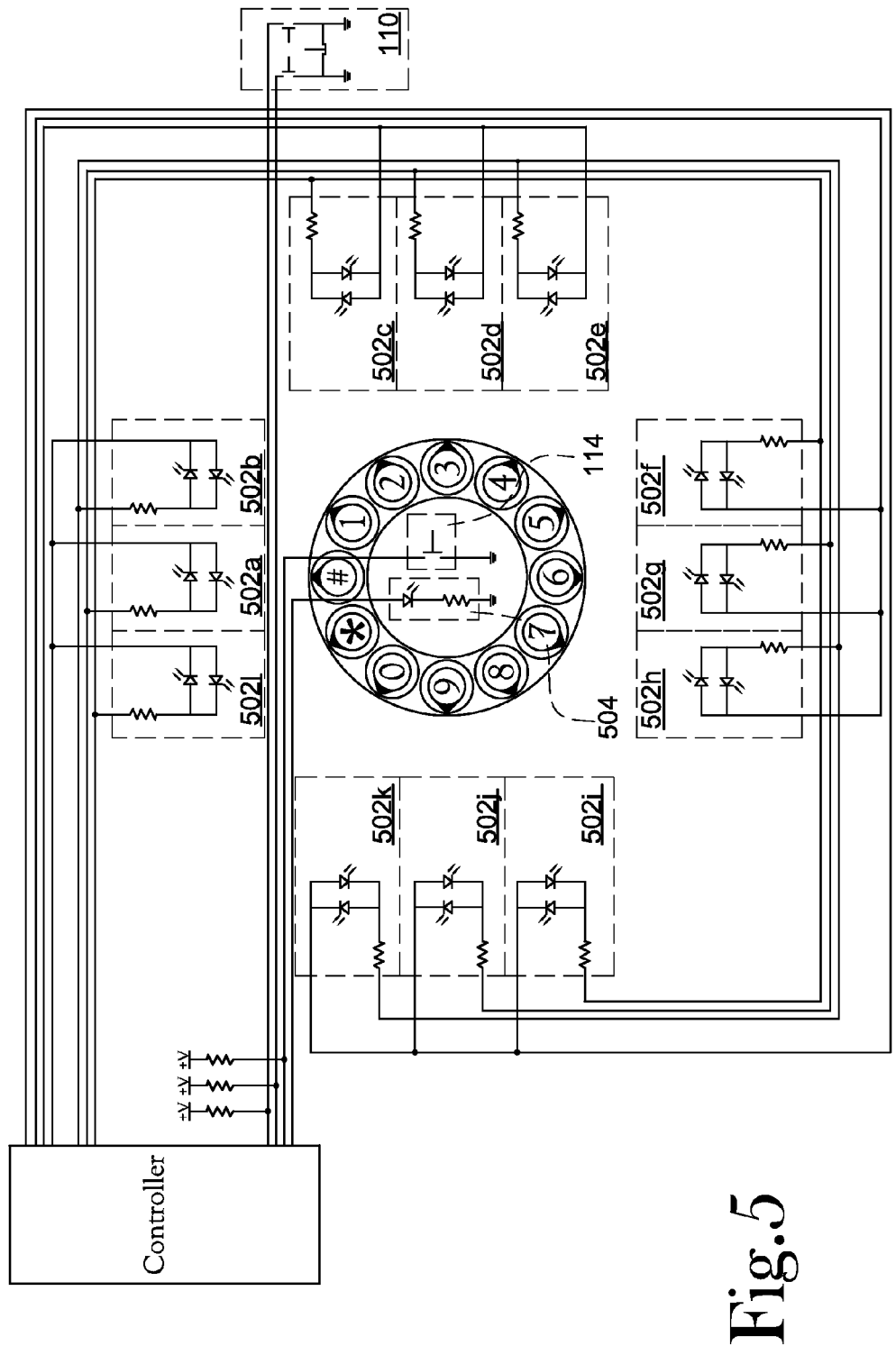
FIG. 5 is a schematic of one embodiment of the dialer of the SFF communication device.

FIG. 5 illustrates a schematic of one embodiment of the user interface, referred to as the dialer circuit, in communication with the controller. In the illustrated embodiment, the dialer circuit includes the function switch 110, the symbol ring 112, and the special action button 114. The function switch 110 provides access to the functions associated with each position on the symbol ring 112 by moving the selection indicator clockwise or counter-clockwise around the symbol ring 112 and selecting a function associated with the current position of the selection indicator on the symbol ring 112. Generally, the function switch provides at least three unique outputs that identify the direction of movement and when a selection is made. In the illustrated embodiment, the function switch electrically appears as a three interconnected push-button switches, which can be implemented using a push-button bi-directional rocker switch or a push-button bi-directional rotary switch. The function switch generates a first signal (e.g., an "up" or "counter-clockwise" signal) when rocked in one direction, a second signal (e.g., a "down" or "clockwise" signal) when rocked in the opposite direction, and a third signal (e.g., a "selection" signal) when the switch is depressed. When the function switch is actuated, a position value maintained by the controller is updated, and the controller outputs corresponding drive signal to the symbol ring.

More specifically, the illustrated dialer circuit is designed primarily as a number pad replacement for telephone operation. Accordingly, the illustrated symbol ring includes 12-positions allowing access to keys found on a conventional telephone keypad (i.e., the digits 0-9 and the "*" and "#" symbols). Those skilled in the art will appreciate that other number of positions and symbols may be used without departing from the scope and spirit of the present invention.

In the illustrated embodiment, the dialer circuit includes a selected number of dialer LED circuits 502a-502l corresponding to the desired number of positions available on the symbol ring. The drive signal causes the LED in the position corresponding to the current position value maintained by the controller to illuminate. Thus, the symbol ring 112 provides a visual confirmation of the actuation of the function switch.

Figure 6:
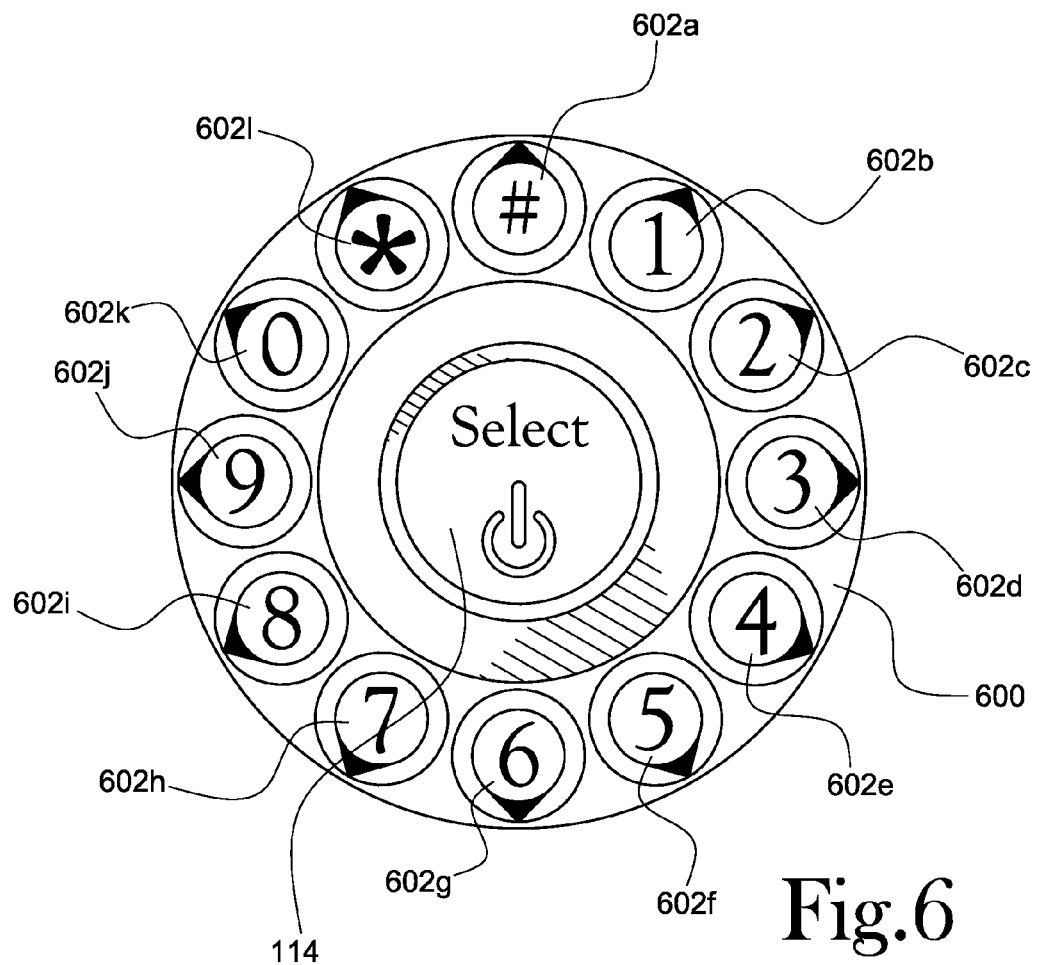
FIG. 6 is a front elevation of one embodiment of the symbol ring.
Figure 7:
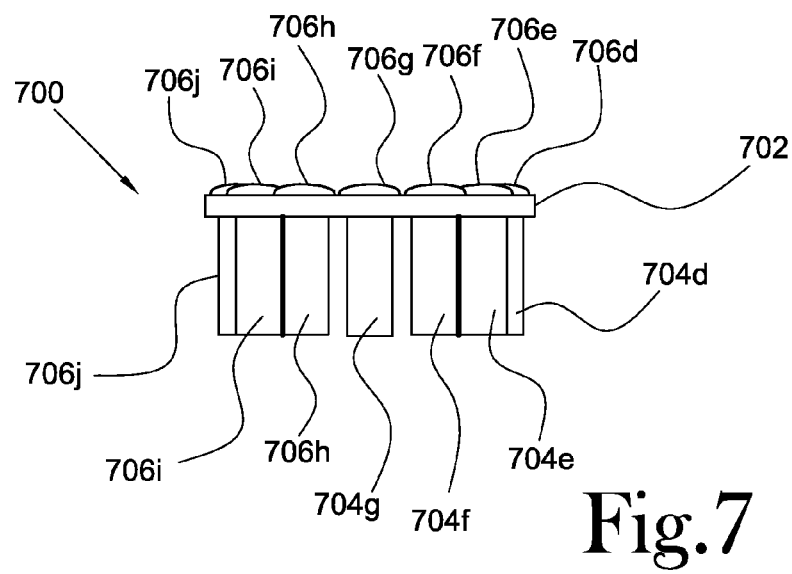
FIG. 7 is a side elevation of one embodiment of the symbol ring of FIG. 6.

FIG. 6 illustrates a top view of the symbol ring 112 encircling the special action button 114. The symbol ring 112 includes individually illuminable symbols 602a-602l and FIG. 7 shows the symbol ring illumination assembly 700 that includes a plurality of light tubes 704a-704l that are held in position by a collar 702. In one embodiment, the housing provides the face of the symbol ring 112 and a plurality of light tubes openings, and the collar 702 fits below that portion of the housing allowing the faces 706a-706l of the light tubes to extend through the light tube openings. In another embodiment, the symbol ring 112 serves as the collar 702, and the complete assembly is fitted in a larger opening in the housing. The light tubes 704a-704l carry light from the dialer LED circuits 502a-502l within the housing to the face of the small form factor communication device 100. The faces 706a-706l of the light tubes 704a-704l are slightly curved to create a domed surface. The domed surfaces provides a raised area (i.e., a rim or lip) around the special action button 114 that helps prevent the special action button 114 from being accidentally pressed. Additional protection against accidental activation of the special action button 114 is obtained, as desired, through programming that requires the special action button 114 to be depressed for a certain amount of time before activating the function and/or by generating a feedback or notification sound or vibration to alert the user that the special function button 114 has been depressed. In the illustrated embodiments, the controller, the light tubes 704a-704l, and the dialer LED circuits 502a-502l cooperate to implement the selection indicator with the controller driving the appropriate dialer LED circuit 502a-502l based on the value of the counter maintained by the controller in response to actuation of the function switch 110.

To dial a standard phone number, only the digits 0-9 are required. This is considered the default or standard mode of operation for the function switch 110. In other words, if the function switch 110 is first actuated to select a number, the controller responds with a manual dialing mode where the sequence of numbers selected using the function switch 110 are collected and dialed. In manual dialing mode, the symbols can be used to interact with automated phone response systems (e.g., voice mail or menu systems).

The symbols on the symbol ring 112 represent additional modes that can be accessed using the function switch 110. In one embodiment, when the first selection in a sequence is "*", the controller enters a speed dial mode in which it waits for one or more digits to be selected. The digit(s) selected subsequent to the "*" identify the memory location where a pre-programmed phone number is stored. The SFF communication device 100 automatically dials this number.

In another embodiment, when the first selection in a sequence is "#", the controller enters auxiliary mode. In auxiliary mode, a particular auxiliary function (e.g., a function not specific to telecommunications) is activated. Examples of auxiliary functions include taking of a picture in a communication device having an integrated camera, reading a bar code or RFID tag in a communication device having the appropriate reader, activating or deactivating the GPS receiver, locating another GPS receiver (i.e., requesting position information from another GPS system through the cellular phone network) and indicating the relative position, showing a clock, and playing a game on the SFF communication device. This list is not intended to be exhaustive of the available auxiliary functions.

In one embodiment, the SFF communication device 100 provides feedback when the function switch 110 is actuated. The feedback can be a mechanical response from the function switch itself or a generated response from the controller. One embodiment of the mechanical feedback would be the tactile response when a rocker switch is used because of the rotary motion of the switch is physically limited. Another embodiment would be an audible response mechanically-generated by the function switch, such as a clicking sound when a rocker switch is actuated or when a rotary dial has been rotated a specified amount. A still further embodiment exists where the controller causes an audible response or a vibratory response to be generated when it detects a signal level change or receives a signal from the function switch 110.

One benefit of receiving feedback when the function switch is actuated is the ability to operate the SFF communication device 100 simply by touch. By keeping up with the feedback, the user can accurately dial a phone number or access other features without having visual contact with the SFF communication device 100. For example, a user can effectively operate the SFF communication device 100 without removing it from a pocket, which lends itself to discrete usage. Alternatively, the feedback can vary depending upon the current position value (e.g., the feedback is a number of short sounds/vibrations equal to the current digit and a sequence of long sounds to indicate the symbols). The feedback system can be expanded to provide different responses depending on both the mode and the position value.

The special action button 114 is a push button switch that is pre-programmed to perform a specific action. A typical use would be as a panic button to automatically dial a specific number (e.g., campus security, a parent or guardian, 9-1-1, etc.). The special function does not have to be a speed dial function and can be other available functions, such as taking a picture. In a typical embodiment, the function of the special action button 114 can be associated with a selected function of the communication device 100 by the user through the function switch 110. In another embodiment, the number or function associated with the special action button 114 can only be programmed by an external device connected to the SFF communication device using the external communication port. This prevents the number or function from being accidentally changed when using the function switch 110 or purposefully changed by the user. Limiting the programming of the special action button 114 in this manner allows an organization, such as a university, to issue SFF communication devices to students that can be used to quickly contact campus security in the event of an emergency without having those communication devices diverted to other purposes.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A communication device comprising:
a housing having a first face, a second face opposing said second face, a first end, a second end opposing said first end, a first side, and a second side opposing said first side;
a function switch located on said first side of said housing, said function switch being moveable from a resting position to a first position, a second position, and a third position, said first position being in a first direction from said resting position, said second position being in a second direction from said resting position, said second direction being opposite to said first direction, said third direction being inward relative to said housing and orthogonal to said first direction and said second direction;
a controller maintaining a counter, said counter being initialized to zero, said controller incrementing said counter when said function switch is moved to said first position, said controller decrementing said counter a second input when said function switch is moved to said second position, and said controller operating on said counter and setting said value of said counter to zero when said function switch moved to said third position;
a symbol ring located on said first face of said housing, said symbol ring displaying a plurality of symbols, each symbol of said plurality of symbols corresponding to a value of said counter; and
a selection indicator adapted to indicate a selected symbol in said symbol ring based on the value of said counter.

* * * * *